Figure 10:
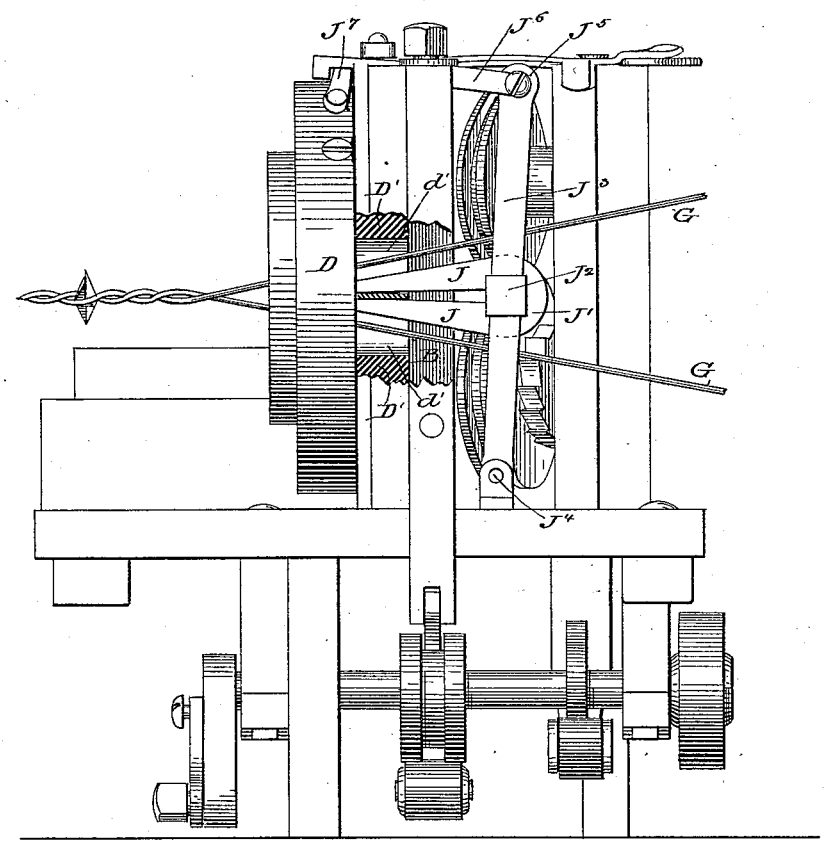

(Model.) 4 Sheets—Sheet 1.
E. CHILDREN.
MACHINE FOR MAKING BARB FENCE WIRE.
No. 250,422. Patented Dec. 6, 1881.
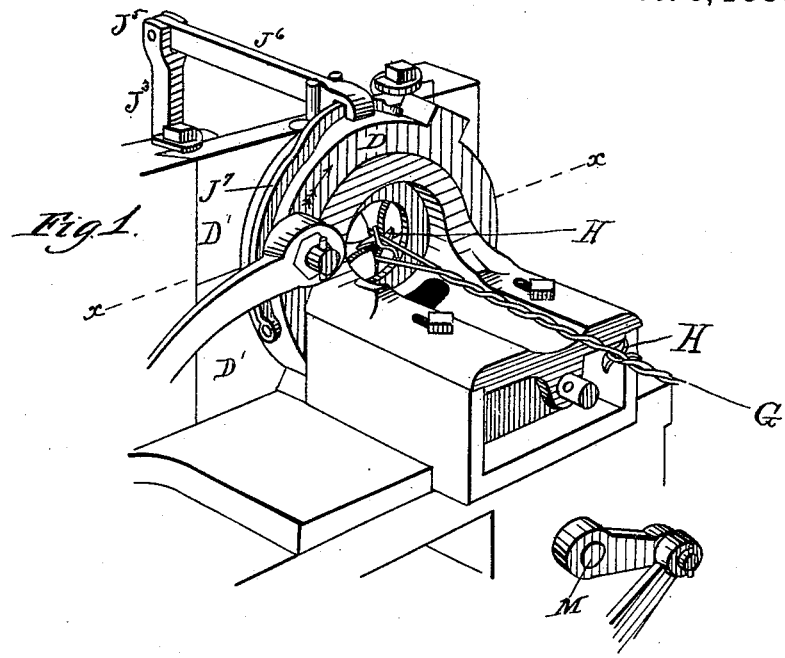
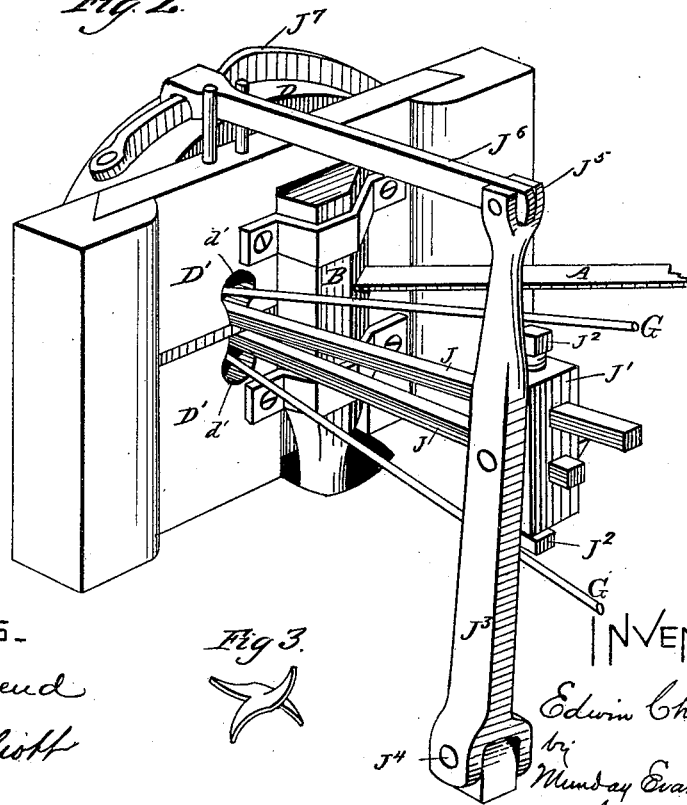
Witnesses
F. B. Townsend
Jno. G. Elliott
Inventor
Edwin Children
by
Munday Evarts & Adcock
his attys (Model.) 4 Sheets—Sheet 2.
E. CHILDREN.
MACHINE FOR MAKING BARB FENCE WIRE.
No. 250,422. Patented Dec. 6, 1881.
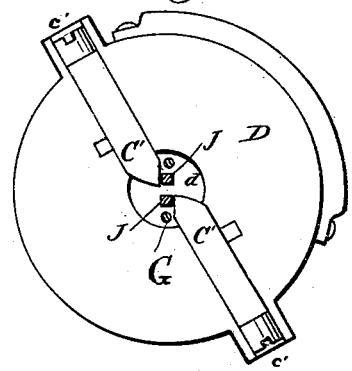
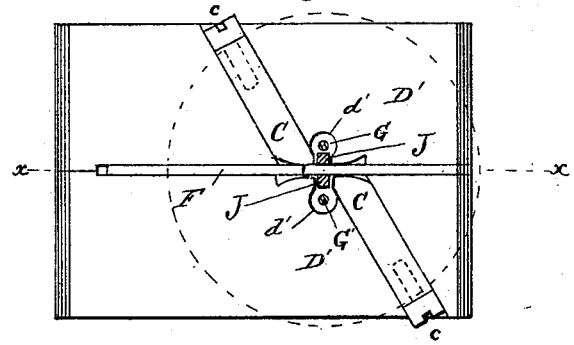
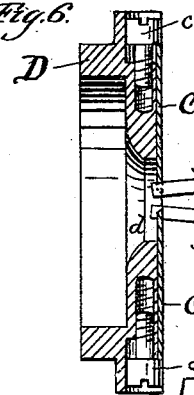
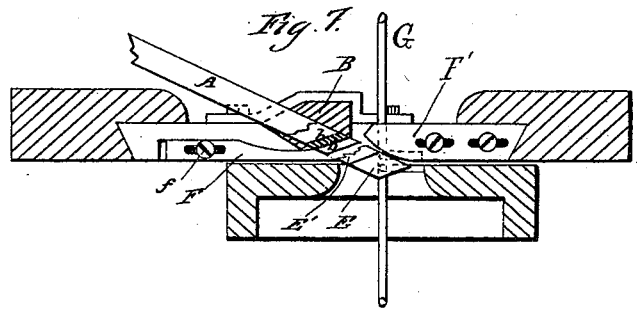
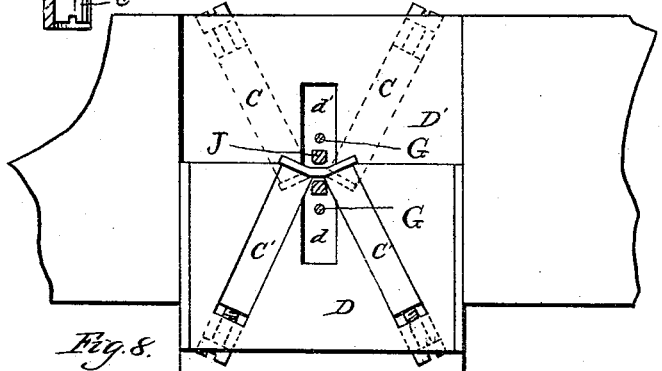
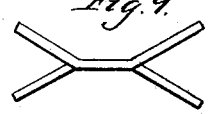

(Model.) 4 Sheets—Sheet 3.

E. CHILDREN.
MACHINE FOR MAKING BARB FENCE WIRE.

No. 250,422. Patented Dec. 6, 1881.

Witnesses:
J. Everett Brown
H. W. Munday

Inventor:
Edwin Children
by Munday, Evarts & Adcock
his attys (Model.)
4 Sheets—Sheet 4.
E. CHILDREN.
MACHINE FOR MAKING BARB FENCE WIRE.
No. 250,422. Patented Dec. 6, 1881.
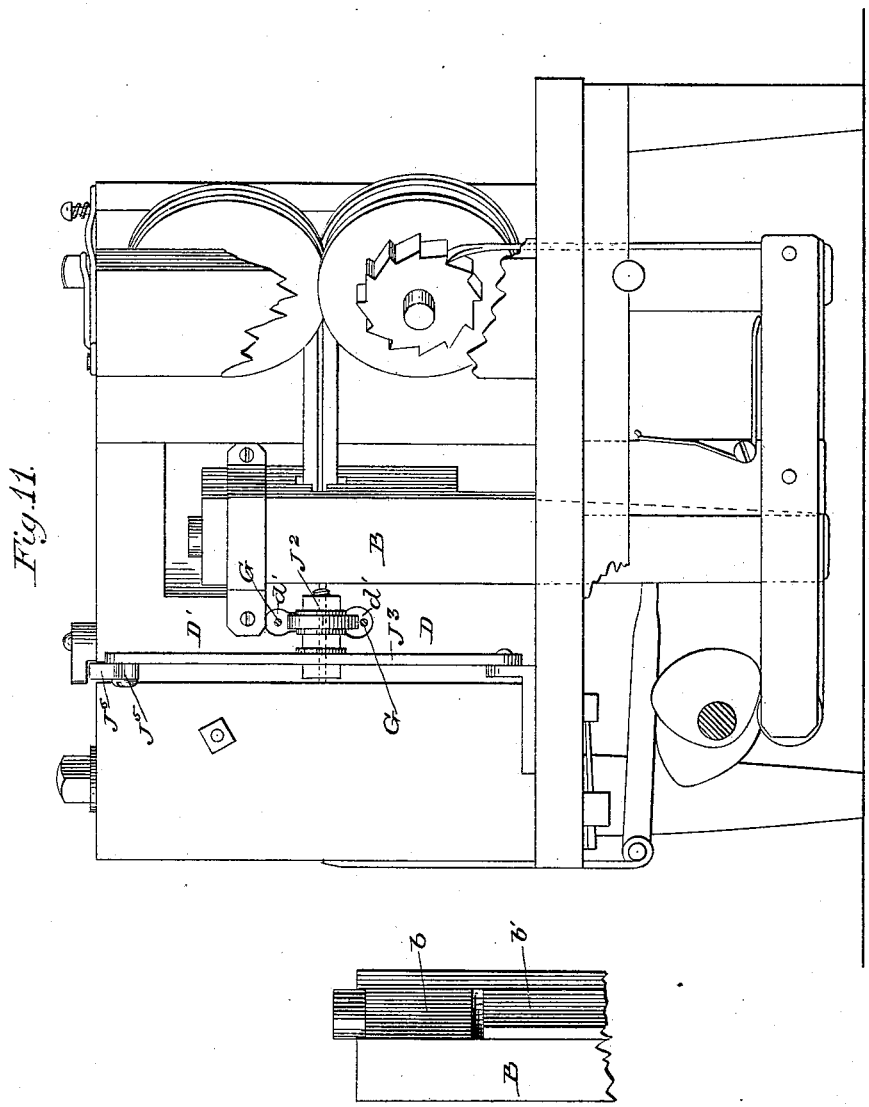
Witnesses:
N. W. Munday
J. Everett Brown
Inventor:
Edwin Children
by Munday, Evarts & Adcock
his attorneys

UNITED STATES PATENT OFFICE.

EDWIN CHILDREN, OF EAST DUBUQUE, ILLINOIS.

MACHINE FOR MAKING BARB FENCE-WIRE.

SPECIFICATION forming part of Letters Patent No. 250,422, dated December 6, 1881.

Application filed December 4, 1880. (Model.)

*To all whom it may concern:*

Be it known that I, EDWIN CHILDREN, of East Dubuque, in the county of Jo Daviess and State of Illinois, have invented certain Improvements in Machines for Making Barb Fence-Wire, of which the following is a specification.

This invention relates to an improvement upon the machine for cutting and forming sheet-metal fence-barbs set forth in Letters Patent No. 212,091, granted to Edwin and Arthur G. Children, February 11, 1879. That machine was designed to make what was known as the "Frentress sheet-metal fence-barb." The material employed was a flat bar or band of sheet metal, fed into the machine diagonally between a pair of cutting-off knives, which severed from the end of the bar, at each stroke, a diamond-shaped blank by a diagonal cut from the bar. The severed blank, lying in a channel which was a continuation of the feedway of the bar, was pushed forward by the feed of bar between reciprocating knives, which split the diamond blank part way toward the center from each of the opposite acute angles, and by the same shearing action bent the points thus formed properly to make a four-pointed sheet-metal barb of the blank. The feed-channel between the severing and the splitting and forming knives was made long enough so that there should be in the machine at the same time two severed blanks, one lying ready to be pushed forward between the forming and splitting knives and one already in said knives undergoing the operation of splitting and forming, all of which, together with the gearing for producing the necessary motions of the several parts, is more fully and explicitly described in the said patent, to which I beg leave to refer for greater certainty; and in the present specification of improvements upon the form of machine referred to, I have deemed it necessary to show and describe only those portions of the complete machine which are necessary to a correct comprehension of the improvements which I have made.

The present invention relates, in the first place, to a change in the splitting and forming die to enable two fence-wires to be passed through it, leading from a pair of delivery-spools to a twisting-spool, whereby, as will be presently more fully explained, the barb, as soon as it is formed, is found between the wires in position to be intertwisted with the strand as it is discharged from the knives, making by this simple change the machine which automatically completes the fence-wire.

The invention relates, in the second place, to the provision of two supports for the severed diamond-shaped blank, one above and the other below, which support the middle portion of the blank while the splitting and forming dies or knives are operating upon it, as will be hereinafter more fully explained. By the employment of these supports I am enabled to use an inferior quality of metal for the barbs without danger of tearing the blank in two by the operation of forming, which cheapens the product without lessening its value in any degree.

In the accompanying drawings, which form a part of this specification, Figure 1 is a perspective view, taken from the front, of the portion of the machine which operates upon the barb. Fig. 2 is a similar view of the same portion, taken from the rear. Fig. 3 is a perspective view of one of the completed barbs. Fig. 4 is a view of the inner face of the rotary reciprocating knife-carrying head and knives, forming half of the splitting and forming device. Fig. 5 is a face view of the stationary counterpart of Fig. 4. Fig. 6 is a cross-section of Fig. 4, taken through the knives. Fig. 7 is a horizontal section of Fig. 1 on the line $x\,x$. Fig. 8 is a sketch of a modification of the splitting and forming device, in which, for the rotary movement, is substituted a straight up-and-down reciprocation; and Fig. 9 is a side view of the barb as formed by the modified structure. Fig. 10 is a side elevation of the unmodified machine, having some of the supporting parts broken away to show the construction of the operating parts. Fig. 11 is a rear view of the same.

Like letters indicate like parts wherever used in the several figures.

In said drawings, A represents the bar of metal from which the blanks are formed, which is fed to operative part of the machine in the same manner, and may be fed by the same mechanism, as described in the patent above referred to.

B is the reciprocating knife-block, operated as in said former patent.

b b (shown in dotted lines in Fig. 7) are the severing-knives, one stationary and one carried by the knife-block.

C C are the stationary knives of the splitting and forming device.

C' C' are the rotary reciprocating knives, mounted in the head D. These two countering parts, which I term in the aggregate a "knife-die," operate the same as the corresponding parts in the patent referred to. The knives, however, are different somewhat in structure, being made of plain straight bars of steel set in grooves, and provided with adjusting-screws c c', to set forward the cutting-edges as they become worn by use.

E is the diamond-shaped blank in situ in the knife-die.

E' is the diamond-shaped blank which has been severed, or partially severed, as the case may be, owing to the adjustment of the machine, preparatory to being pushed into the knife-die.

The head D is pierced at the center with a large opening, d, and the plates D', which sustain the stationary knives C C, are provided with roomy apertures d', one above and the other below the place of the barb, large enough to permit the free passage of the fence-wire and a splice-twist, if necessary, above and below the barb. These fence-wires lead out through the aperture d toward the twisting-spool, as shown at Fig. 1.

I have found it convenient to make that portion of the feed-channel through which the blanks pass, immediately at the knife-die, adjustable, to compensate for any wear that may take place. This I do by means of the bar F, inserted between the plates D', which, being provided with a slot and adjusting-screw, f, may be set forward as it becomes worn, or for any other purpose of adjustment.

G G' are the two fence-wires, which are fed from spools through the machine to a twisting-spool.

H represents an intertwisted barb.

I have not thought it necessary to show either the supply-spools or the twister, as these are now well-known devices in common use in barb-fence machines, and although they form an essential part of the machine as a whole, yet any of the ordinary devices for that purpose may be used.

The supports for supporting the middle portion of the barb during the operation of the knife-die are marked upon the drawings J J. They may be stationary, as the knives do not revolve far enough to strike them; but I prefer to make them movable, with a motion so contrived and timed that they shall be withdrawn while the blank is being fed between the knives of the knife-die, so that they may not interfere with the feed. To impart this motion to the supports I make them in the form of long rods, as shown more clearly at Fig. 2. These support-rods or prolongations of the supports pass through apertures in the head J', being held by set-screws J² for purposes of adjustment. The head is pivoted to an arm, J³, which, in turn, is pivoted at a point, J⁴, to the frame of the machine, and at the opposite extremity, J⁵, said arm J³ is pivoted to a bar, J⁶, the other end of which clasps or sits astride of a cam, J⁷, on the rim of the head D, so that the partially rotary reciprocation of said head is converted by the chain of appliances just indicated into the proper movement and timing at the supports, whereby the supports are withdrawn while the barb is being fed into the knife-die.

The shaft M of the present machine corresponds with the shaft B of the old machine described in the patent heretofore referred to. This fact is mentioned in order to a clearer comprehension of the modification shown in Fig. 8, now to be briefly described. It is enough to say of this modification that the part which corresponds to the head D is given a straight up-and-down movement from the shaft end by any proper means—such as the cam N, working in a cross-head, N'. In the modification the knives C' C' in the head D, both of them, point upward and attack the blank from beneath, instead of one of them pointing up and the other down, and to counter this the stationary knives C C both point downward. The apertures d and d' may, in this case, consist of plain slots of any suitable size. In consequence of this change in the position of the knives, or rather the relative position of the pairs of knives, there will be a difference in the formation of the barb amounting to this, that both points at one side or half of the blank will be bent upward, and both points at the other half downward, as shown at Fig. 9, instead of in the alternate fashion shown at Fig. 3. Upon the opposite side of the barb-feed passage, opposed to the bar F, already described, is a similar adjustable bar, F', which guides the blanks to position, and is subjected to the same wear as the bar F.

The supports J also assist in giving shape to the barb by resisting the tendency of the center to bend under the operation of bending the points, and by causing a slight shoulder to be formed in the points at their juncture with the center or body of the barb, which are beneficial results; and hence, and because of this effect, said supports will be found useful with barb forming or shaping mechanisms other than those shown. The barb shown in Fig. 3 does not contain the shoulder here referred to; but it is analogous to the abrupt bend given to the points in the one illustrated in Fig. 9, and extends clear to the dividing-line between the body and points.

Having described my invention, I claim—

1. The combination, in a machine for making bent sheet-metal barbs, of the barb-formers with their supports having in them apertures for the passage of the fence-wires, one above and the other below the operating-faces of the formers, substantially as set forth.

2. The combination, with the devices for forming the points of the barb preparatory to its being secured in the wires, of supports located above and below the body of the barb, and preventing injury to or bending of that part during the operation of said forming devices, substantially as set forth.

EDWIN CHILDREN.

Witnesses:
JOHN W. MUNDAY,
EDMUND ADCOCK.